United States Patent [19]
Schlosser et al.

[11] Patent Number: 5,167,183
[45] Date of Patent: Dec. 1, 1992

[54] SMOKER ATTACHMENT FOR A PORTABLE GAS GRILL

[75] Inventors: Erich J. Schlosser, Barrington; James C. Stephen; Robert T. Stephen, both of Arlington Heights, all of Ill.

[73] Assignee: Weber-Stephen Products Co., Palatine, Ill.

[21] Appl. No.: 392,079

[22] Filed: Aug. 10, 1989

Related U.S. Application Data

[63] Continuation-in-part of Ser. No. 231,778, Aug. 12, 1988, abandoned.

[51] Int. Cl.$^5$ .............................. A23B 4/052
[52] U.S. Cl. .................. 99/482; 126/25 R; 126/41 R
[58] Field of Search .......... 99/401, 402, 410–412, 99/414, 416, 417, 421 H, 424, 448–450, 481–483, 340, 473; 126/25 R, 41 R

[56] References Cited

U.S. PATENT DOCUMENTS

| | | | |
|---|---|---|---|
| 3,611,911 | 10/1971 | Martin | 99/482 |
| 3,693,534 | 9/1972 | Martin | 99/482 |
| 4,140,049 | 2/1979 | Stewart | 99/483 |
| 4,697,506 | 10/1987 | Ducate, Jr. | 99/482 |
| 4,770,157 | 9/1988 | Shepherd et al. | 126/25 R |

Primary Examiner—Harvey C. Hornsby
Assistant Examiner—Mark Spisich
Attorney, Agent, or Firm—Wallenstein Wagner & Hattis, Ltd.

[57] ABSTRACT

A smoker attachment 200 for a portable gas grill 10, the smoker attachment 200, 250 including a housing and a support mechanism (201, 300) for the housing above the heat producing section to allow the flavoring of food which is cooked using the gas grill. The housing defines an open topped chamber that is closed by a hinged cover (230) and has an apertured bottom wall segment (214). The housing supports a water tray (234) and has a bottom slotted wall (212, 213, S). The support (201, 300) defines a heat-directing channel which directs heat to the bottom wall.

15 Claims, 4 Drawing Sheets

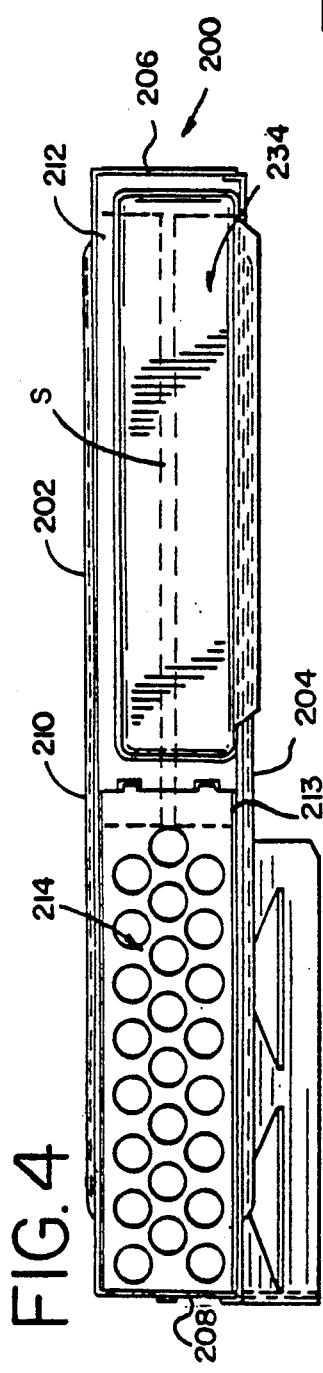
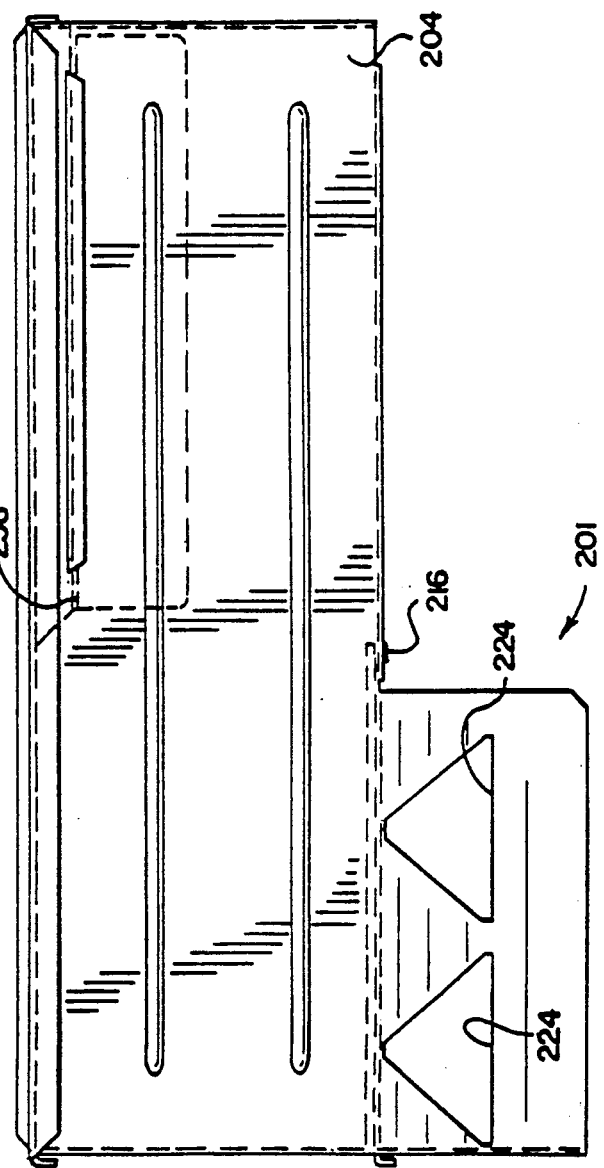
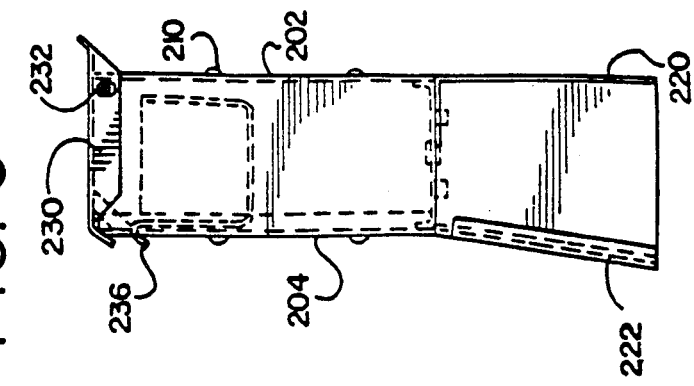

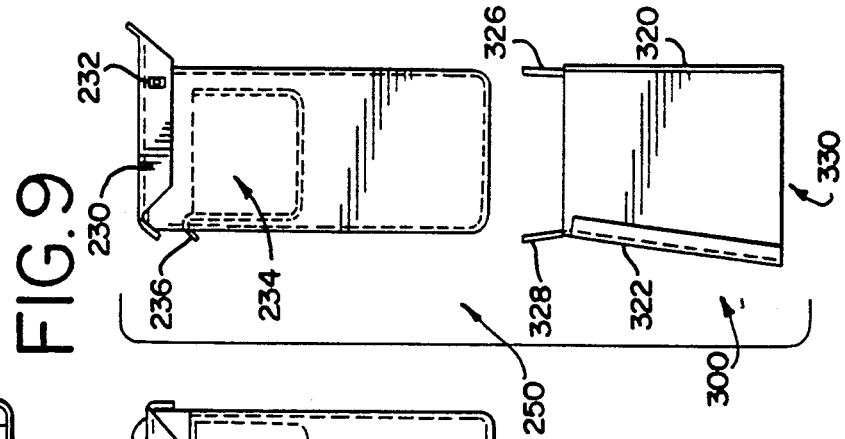
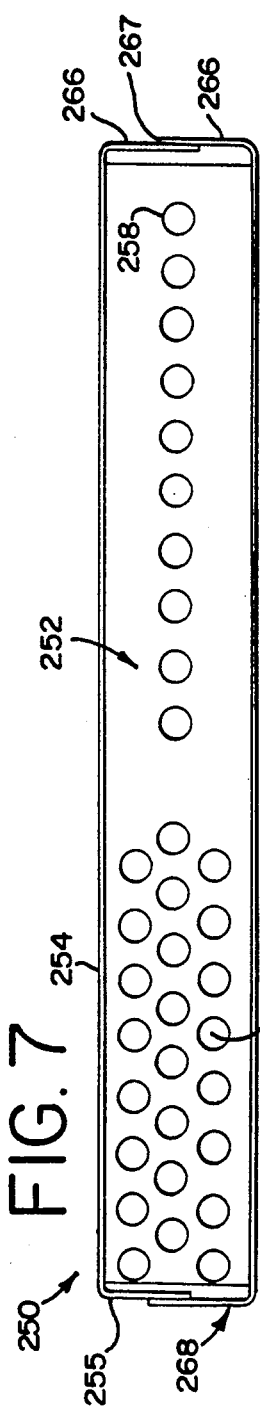
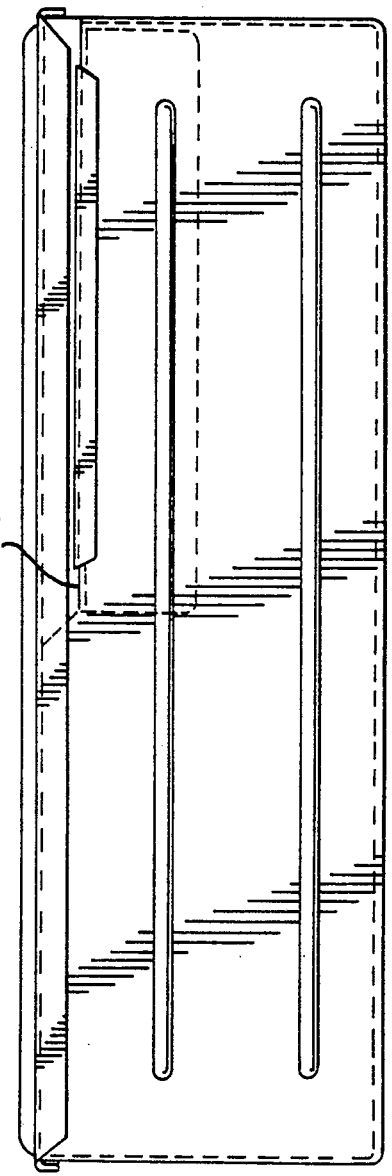

SMOKER ATTACHMENT FOR A PORTABLE GAS GRILL

REFERENCE TO RELATED APPLICATIONS

This application is a continuation-in-part of U.S. application Ser. No. 231,778, filed Aug. 12, 1988, abandoned.

DESCRIPTION

1. Technical Field

The present invention relates generally to outdoor cooking devices and, more particularly, to a smoker accessory for portable gas grills.

2. Background Prior Art

Portable gas grills have become increasingly popular in recent years because of the interest in outdoor cooking. Conventionally, portable gas grills include a burner assembly adjacent the lower portion of a firebox with a cooking grid supported along the upper edge and lava rock located on a bed between the two. The lava rock absorbs the heat from the burning gas and thus provides a generally uniform heat producing means for the food being cooked.

Recently, a portable gas grill has been developed by the assignee of the present invention which eliminates the need for lava rock and such grill is disclosed in U.S. Pat. No. 4,677,964. The portable grill disclosed therein has revolutionized the gas grill industry by eliminating the need for the lava rock, which traditionally had to be replaced periodically. The gas grill disclosed therein utilizes sear bars which are positioned between the cooking grid and the gas burners to vaporize any greases that emanate from the food being cooked.

While the new gas grill has received a remarkable degree of consumer acceptance, manufacturers are constantly striving to improve the product to enhance its appeal to the consumer. Thus, the present invention is directed towards improvements in the gas grill disclosed in the above patent, more specifically, toward a smoker attachment for use with the gas grill.

SUMMARY OF THE INVENTION

According to the present invention, a gas grill of the type disclosed in the above-mentioned patent, incorporates a novel smoker attachment that makes the grill more versatile to the potential customer.

More specifically, the gas grill has a sear bar assembly positioned between the gas burners in the lower section and the cooking grid with a smoker attachment adapted to be supported on the sear bar assembly.

One embodiment of the smoker attachment includes a generally rectangular housing that is closed at its bottom and has depending legs or plates extending from opposite edges of the bottom which have apertures that receive at least a plurality of sear bars to position the smoker attachment within the fire chamber. The smoker attachment also has a cover hinged to an upper edge thereof and a water tray is suspended under the cover by one edge of the housing.

In another embodiment of the smoker attachment, the generally rectangular housing sits upon a separately formed support means having legs or plates which have apertures to receive a plurality of sear bars to position the smoker within the fire chamber. The legs have extensions at their upper ends to fittingly receive the bottom of the housing. This embodiment allows the rectangular smoker housing to be easily removed for cleaning without removing other components of the grill or the smoker support means.

BRIEF DESCRIPTION OF DRAWINGS

FIG. 4 is a top view of the smoker attachment shown in FIG. 2;

FIG. 5 is a side view of the smoker attachment of FIG. 4;

FIG. 6 is an end view of the smoker attachment of FIG. 4;

FIG. 7 is a top view similar to FIG. 4 showing a modified smoker attachment;

FIG. 8 is a side view of the smoker attachment of FIG. 7; and,

FIG. 9 is an end view of another embodiment of the smoker attachment.

DETAILED DESCRIPTION

Figure 1:
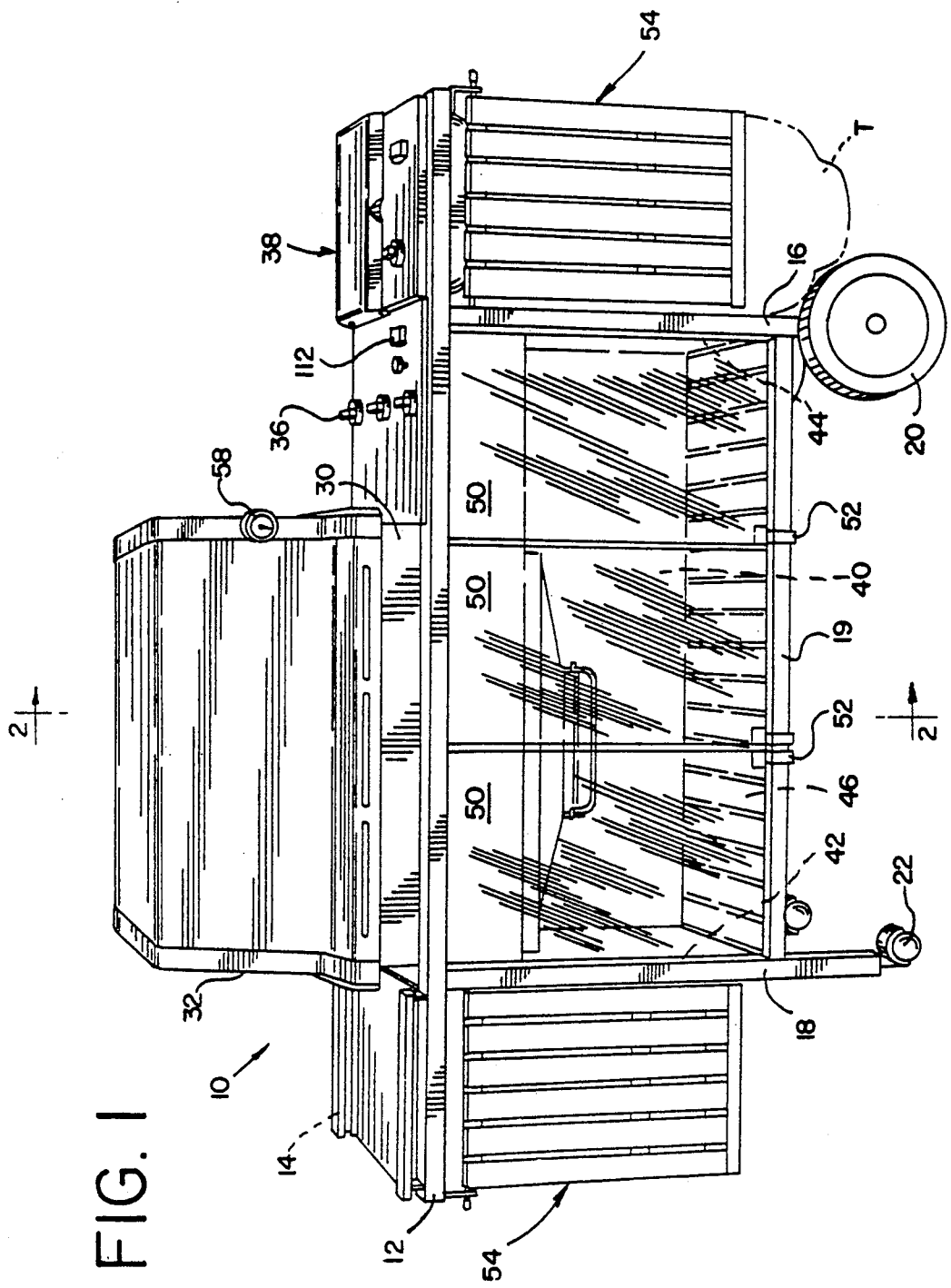
FIG. 1 is a perspective view of the gas grill having the features of the present invention incorporated therein.

While this invention is susceptible of embodiment in many different forms, there is shown in the drawings and will herein be described in detail, preferred embodiments of the invention, with the understanding that the present disclosure is to be considered as an exemplification of the principles of the invention, and is not intended to limit the broad aspect of the invention to the embodiments illustrated.

FIG. 1 of the drawings shows a gas barbecue grill, generally designated by reference numeral 10. The gas barbecue grill is in many respects similar to the grill disclosed in U.S. Pat. No. 4,677,964, assigned to the Assignee of the present invention, and incorporated herein by reference.

The grill 10 includes a generally rectangular framework consisting of a pair of horizontal tubes 12 and 14 that are interconnected by cross-members (not shown). The side frame members 12 and 14 are supported through two pairs of depending posts or legs 16 and 18 interconnected by cross members 19. The depending posts 16 have wheels 20, while the depending posts 18 have universally rotatable casters 22.

The frame structure supports a housing 30 that defines a fire chamber, as will be explained later. The housing 30 has a cover 32 hinged by hinge 33 (FIG. 2) and has a plurality of burner tubes 34 in the lower portion thereof. Gas is supplied to the burner tubes 34 from a tank T through suitable conduits and valves (not shown), which are controlled by control knobs 36. A side burner 38 is supported on the frame members 12 and 14. The side burner 38 is constructed in accordance with the teachings of a co-pending application Ser. No 231,499, filed Aug. 12, 1988, now U.S. Pat. No. 4,860,724.

The entire area between the front and rear posts 16 and 18 is completely enclosed. Thus, a closure member 40 extends between the rear posts 16 and 18 to completely enclose the area between the upper cross-member 14 and lower cross-member 19. Likewise, an enclosure 42 encloses the space between the front posts or legs 18, while a plate 44 encloses the rear area between the posts 16. The bottom of the enclosure between the post 19 has a plurality of slats 46 which are spaced from each other to allow air flow into the enclosed area during cooking.

The front of the enclosed area is enclosed by three pivoted doors 50. The doors are preferably of the type that can be installed and removed by merely manipulating the door assembly, which is preferably formed of glass. Thus, the door assembly has a hinged axis defined by a lower fixed hinge pin received into a bracket having an aperture, while an upper pin is spring-biased outwardly and is received into a fixed bracket. Thus, the door can be installed by inserting the upper pin in the top bracket and forcing the door up to clear the lower bracket and the lower pin can then be dropped into the lower bracket. Preferably, each door has a locking clip 52 associated therewith.

Figure 2:
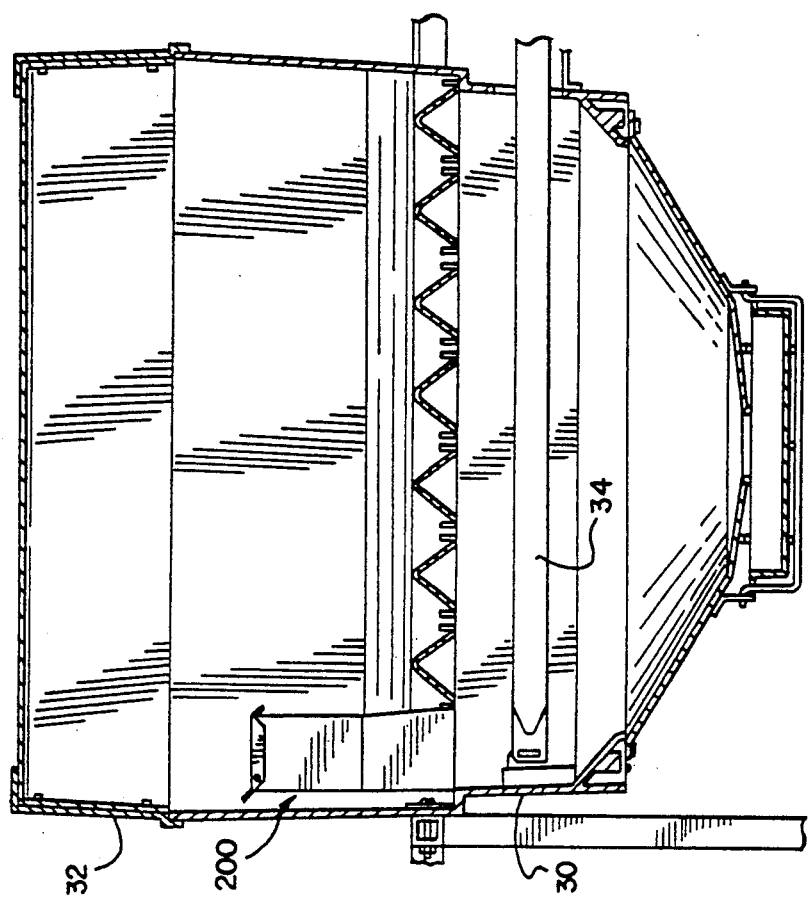
FIG. 2 is a cross-sectional view, as viewed along line 2—2 of FIG. 1 showing one embodiment of the smoker attachment in position.
Figure 3:
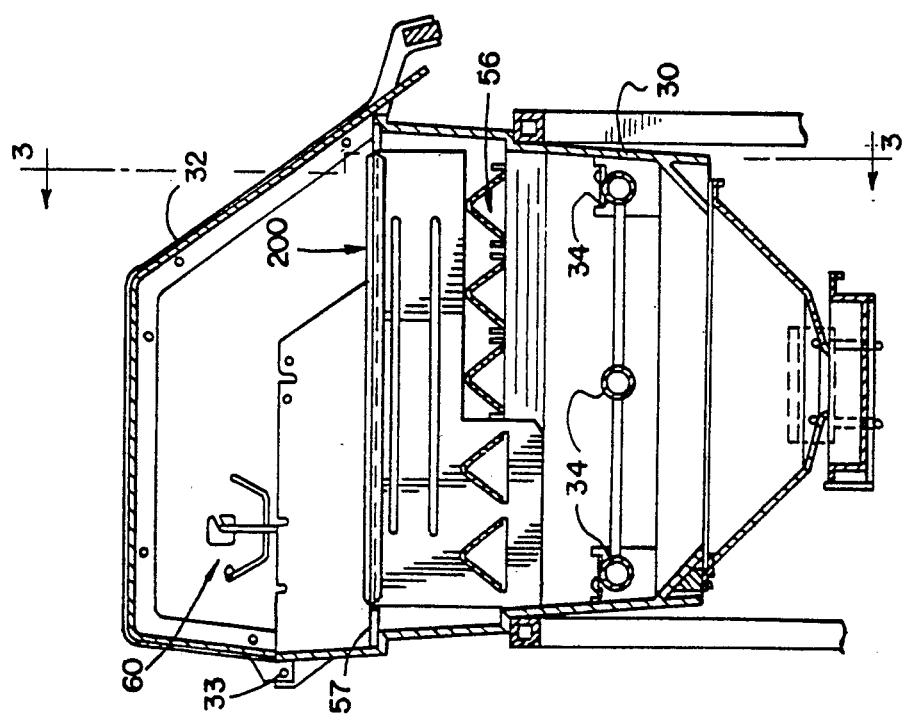
FIG. 3 is a cross-sectional view as viewed along line 3—3 of FIG. 2.

The gas grill 10 also has a pair of work-supporting surfaces 54 located at opposite ends thereof and pivotally supported on the frame member 12. As disclosed in the above patent, the gas grill has first and second sets of sear bar grids 56 above the burner tubes 34 and below the cooking grid 57 (FIG. 2).

According to the present invention, the barbecue grill incorporates a smoker attachment for providing the desired flavor to the food that is being cooked. It is well known that in many instances certain flavors may be desirable to enhance the taste of the food products. For example, many times hickory chips are utilized for producing smoke that will add to the flavor of the food. In addition, many times it is desirable to add moisture to the cooking environment to prevent the food from being dried out during the cooking process. Thus, when large items, such as turkeys, are being cooked, it is desirable to keep a somewhat moist environment within the closed grill.

As illustrated in FIGS. 2-6, one embodiment of the smoker attachment includes a housing, generally indicated by reference numeral 200, and is preferably supported above the burner tubes by support means 201 with the top edge generally aligned with the cooking grid 57. The details of the smoker attachment are illustrated in FIGS. 4-6. As shown therein, the smoker attachment 200 consists of a generally rectangular hollow housing defined by first and second spaced side walls 202 and 204 and end walls 206 and 208. Preferably, the end walls 206 and 208 are formed integral with the wall 202 which has reinforcing ribs 210 formed integral therewith. The bottom of the housing is preferably partially enclosed with a first plate 212 that is integral with the lower edge of the wall 202 and a second plate 213 integral with the wall 204, which also has ribs 210. The plates define an elongated slot S. An apertured plate 214 is secured into the position illustrated in FIG. 4 by tabs 216.

The walls 202 and 204 have integral depending extensions 220 and 222 (FIG. 6) which define support means for the smoker within the grill. The extensions or plates 220 and 222 have at least a pair of triangular shaped openings 224 which correspond in dimension to the inverted V-shaped sear bars that define the sear grid 56. Thus, the housing can readily be supported in the proper position merely by inserting two of the sear bars through the aligned openings 224 and positioning the sear bars to the position illustrated in FIG. 2. It should also be noted that the plate 222 tapers away from the plate 220 so as to define a channel for directing heat from the gas burners through the apertures 214.

Thus, the plates 220 and 222 not only support the housing 200, but more importantly define a heat-channeling means for diverting heat to the apertured plate 214 to quickly ignite the wood chips supported therein.

The smoker attachment also has a cover 230 which is pivotally supported by pivot pins 232 on the upper edge of the housing. In addition, a water tray 234 has an outwardly directed flange 236 which is configured to be received over the upper edge of the wall 204 so that the tray is suspended in the position, illustrated in FIG. 6. Preferably, the wall 204 has a cut-out portion 238 so that the lip 236 is located below the edge of the cover and defines a small space therebetween that allows for smoke to emanate from the unit. It should also be noted that the plate 222 tapers away from the plate 220 so as to define a channel for directing heat from the gas burners through the apertures 214.

In another embodiment of the smoker attachment, shown in FIGS. 7-9, the smoker housing 250, generally constructed in the manner disclosed above but without depending extensions 220 and 222. In this embodiment, a support and heat-channeling means 300 (FIG. 9) is defined by plates 320 and 322. Plates 320 and 322 have extensions 326 and 328, respectively, to guidingly receive and stabilize the smoker housing 250 in place within the grill. The plates 320 and 322 are preferably connected by a plate 330 at one or both ends and define an upwardly opening cradle, producing a chimney effect to direct heat to the smoker. The plates 320 and 322 also have at least a pair of triangular shaped openings 324 which correspond in dimension to the inverted V-shaped sear bars that define the sear grid 56.

In this modified embodiment, the housing 250 is preferably formed of a one-piece construction. Thus, as illustrated in FIG. 7, the housing includes a metal plate that is deformed to produce a bottom wall 252, two side walls 254, and two end walls 255. The bottom wall has a first set of openings 256, similar to apertured plate 214 and a row of openings 258, equivalent to slot S in the prior embodiment. The end walls 255 are produced by overlapping ends 266 of the plate that are secured to each other by welding at 267. Vent slots 268 are preferably formed between end walls 255 and bottom wall 252. The entire housing is preferably porcelain-coated to prevent rust and for ease in cleaning.

Thus, the support means 300 can readily be placed in the proper position merely by inserting two of the sear bars through the aligned openings 324 and positioning the sear bars to the position illustrated in FIG. 2. After the support and heat-channeling means 300 is placed in the proper position, the housing 250 can be telescoped onto support means 300 between extensions 326 and 328. Extensions 326 and 328 are fashioned to fittingly accept the housing 250. It should also be noted that the plate 322 tapers away from the plate 320 so, as to define a heat-directing channel from the gas burners through the apertured bottom wall. In this embodiment, the housing 250 rests on and is supported on the sear bars and the support means 300 acts primarily as a heat-directing means and positions the housing on the sear bars.

In use, suitable smoke producing particles, such as wood chips or chunks, are introduced into the smoker onto the apertured plate 214 and the heat received through the aperture plate 214 is sufficient to ignite the particles and produce smoke. The narrow slot S prevents sufficient oxygen from entering the housing to prevent ignition of the wood. When the moisture content is required, the water tray may be inserted as shown and an adequate amount of water placed into the tray which will be evaporated from the heat flowing through the aperture plate 214 and produce steam. The smoke will flow through the narrow slot above the lip of the tray and will absorb steam and will then create a layer of smoke adjacent the cooking grid.

While the specific embodiments have been illustrated and described, numerous modifications come to mind without significantly departing from the spirit of the invention. For example, the support means 300 or its equivalent plates 220, 222 could be eliminated and the smoker housing 200, 250 could be supported directly on the sear bars. Thus, the scope of protection is only limited by the scope of the accompanying Claims.

We claim:

1. A smoker attachment for an outdoor cooking device having heat-producing means in its bottom thereof, comprising a generally rectangular hollow housing defining a chamber being closed at its bottom and open at its top with a cover hinged along one upper edge of said housing, said bottom having apertures allowing heat to flow into said chamber to ignite wood chips therein and smoulder to produce smoker within said cooking device, and heat-channeling means adjacent to and extending from said bottom of said housing for supporting said housing above the heat-producing means, for forming a lower channel chamber having an upper channel chamber portion adjacent said housing bottom having said apertures and a lower channel chamber portion below said upper channel chamber portion, and for channeling heat to said apertures, said heat-channeling means being inclined such that said lower channel chamber portion has a greater cross-sectional area than a cross-sectional area of said upper channel chamber portion, said cross-sections of said channel chamber portions being generally parallel to said housing bottom having said apertures and being relatively void of any heat-losing apertures between the heat-producing means and said housing for producing a chimney effect and directing heat to said housing.

2. A smoker attachment as defined in claim 1, further including a water tray supported on an upper edge opposite said one edge.

3. A smoker attachment as defined in claim 1, in which said heat-channeling means includes a pair of plates respectively integral with and extending below said bottom from opposite edges to produce a chimney effect for directing heat to said apertures.

4. A smoker attachment as defined in claim 1, in which said outdoor cooking device includes a firebox defining a chamber having a lower section for generating heat, a cooking grid adjacent an upper edge and a sear grid assembly including a plurality of parallel spaced sear bars with said housing supported on said sear bars, and heat-channeling means carried by said sear bars, said heat-channeling means including a cradle, retained on said sear bars and defining an upwardly open slot for telescopingly receiving said housing.

5. A smoker attachment as defined in claim 1, in which said bottom, includes plates cooperatively defining a narrow slot.

6. A smoker attachment for an outdoor cooking device, the outdoor cooking device includes a firebox defining a chamber having a lower section for generating heat, a cooking grid adjacent an upper edge and a sear grid assembly including a plurality of parallel spaced sear bars, comprising: a generally rectangular hollow housing defining a chamber being closed at its bottom and open at its top with a cover hinged along one upper edge of said housing, said bottom having apertures allowing heat to flow into said chamber to ignite wood chips therein and smoulder to produce smoker within said cooking device; and heat-channeling means adjacent said bottom channeling heat to said apertures supporting said housing above said heat-producing means, said heat-channeling means including a pair of plates respectively integral with and extending below said bottom from opposite edges to produce a chimney effect for directing heat to said apertures, said plates having openings for receiving at least one of said sear bars to support said smoker attachment above said sear grid assembly.

7. A smoker attachment for an outdoor cooking device including a firebox defining a chamber having a lower section for generating heat, a cooking grid adjacent an upper edge and a sear grid assembly including a plurality of parallel spaced sear bars, comprising:

a generally rectangular hollow housing defining a chamber being closed at its bottom and open at its top with a cover hinged along one upper edge of said housing, said bottom having apertures allowing heat to flow into said chamber to ignite wood chips therein and smoulder to produce smoker within said cooking device, said housing being supported on said sear bars; and, heat-channeling means carried by said sear bars, said heat-channeling means including a cradle retained on said sear bars and defining an upwardly open slot for telescopingly receiving said housing, said heat-channeling means including a pair of spaced apertured plates receiving said sear bars.

8. A smoker comprising a generally rectangular housing defining a chamber, open at its top with cover means for closing said top, said housing having a bottom including a first wall segment defining an elongated slot and a second wall segment defining a segment having apertures, and heat-channeling means adjacent to and extending down from said bottom of said housing for not only supporting said housing but also for producing a chimney effect for directing heat to said first wall segment for forming a lower channel chamber having an upper channel chamber portion adjacent said housing bottom having said apertures and a lower channel chamber portion below said upper channel chamber portion, said heat-channeling means being inclined such that said lower channel chamber portion has a greater cross-sectional area than a cross-sectional area of said upper channel chamber portion, said cross-sections of said channel chamber portions being generally parallel to said housing bottom having said apertures and being relatively void of any heat-losing apertures, said heat-channeling means directing heat to said housing.

9. A smoker attachment for an outdoor cooking device having heat-producing means in its bottom thereof, comprising a generally rectangular hollow housing defining a chamber being closed at its bottom and open at its top with a cover hinged along one upper edge of said housing, support means adjacent said bottom supporting said housing above said heat-producing means, said bottom having apertures allowing heat to flow into said chamber to ignite wood chips therein and smoulder to produce smoke within said cooking device, said support means includes a pair of plates adjacent to and extending down below said bottom from opposite edges of said housing for supporting said housing, at least one said plate being outwardly inclined for forming a lower channel chamber having an upper channel chamber portion adjacent said housing bottom having said apertures and a lower channel chamber portion below said upper channel chamber portion such that said lower channel chamber portion has a greater cross-sectional area than a cross-sectional area of said upper channel chamber portion, said cross-sections of said channel chamber portions being generally parallel to said housing bottom having said apertures, said two plates relatively free of heat-losing apertures for producing a chimney effect for directing heat to said housing.

10. A smoker attachment for an outdoor cooking device having a firebox defining a chamber having a lower section for generating heat with heat-producing means, a cooking grid adjacent an upper edge and a sear grid assembly including a plurality of parallel spaced sear bars, the attachment comprising (a) a generally rectangular hollow housing defining a chamber being closed at its bottom and open at its top with a cover hinged along one upper edge of said housing, and (b) support means adjacent said bottom supporting said housing above said heat-producing means, said bottom having apertures allowing heat to flow into said chamber to ignite wood chips therein and smoulder to produce smoke within said cooking device, said support means including a pair of plates respectively extending below said bottom from opposite edges to produce a channel for directing heat, said plates having openings for receiving at least one of said sear bars to support said smoker attachment above said sear grid assembly.

11. A smoker attachment for an outdoor cooking device having heat-producing means in its bottom thereof, comprising a generally rectangular hollow housing defining a chamber being closed at its bottom and open at its top with a cover hinged along one upper edge of said housing, said bottom having apertures allowing heat to flow into said chamber to ignite wood chips therein and smoulder to produce smoke within said cooking device, and heat-channeling means adjacent to and extending down from said bottom of said housing for supporting said housing above the heat-producing means, for forming a lower channel chamber having an upper channel chamber portion adjacent said housing bottom having said apertures and a lower channel chamber portion below said upper channel chamber portion, and for channeling heat to said apertures, said heat-channeling means being inclined such that said lower channel chamber portion has a greater cross-sectional area than a cross-sectional area of said upper channel chamber portion, said cross-sections of said channel chamber portions being generally parallel to said housing bottom having said apertures and being relatively free of heat-losing apertures for directing heat to said housing.

12. A smoker attachment as defined in claim 11, further including a water tray supported on an upper edge opposite said one edge.

13. A smoker attachment as defined in claim 11, in which said heat-channeling means includes a pair of plates respectively integral with and extending below said bottom from opposite edges to produce a chimney effect for directing heat to said apertures.

14. A smoker attachment for an outdoor cooking device having a firebox defining a chamber having a lower section for generating heat with heat-producing means, a cooking grid adjacent an upper edge and a sear grid assembly including a plurality of parallel spaced sear bars, the attachment comprising (a) a generally rectangular hollow housing defining a chamber being closed at its bottom and open at its top with a cover hinged alone one upper edge of said housing and a water tray supported on an upper edge opposite said one edge, said bottom having apertures allowing heat to flow into said chamber to ignite wood chips therein and smoulder to produce smoke within said cooking device, and (b) heat-channeling means adjacent said bottom channeling heat to said apertures supporting said housing above said heat-producing means, said heat-channeling means including a pair of plates respectively integral with and extending below said bottom from opposite edges to produce a chimney effect for directing heat to said apertures, said plates having openings for receiving at least one of said sear bars to support said smoker attachment above said sear grid assembly.

15. A smoker attachment as defined in claim 14, in which said plates cooperatively defines a narrow slot.

* * * * *